Sept. 18, 1934.  A. J. SMITH  1,974,394
TRANSFER MECHANISM
Filed Feb. 24, 1931   3 Sheets-Sheet 1
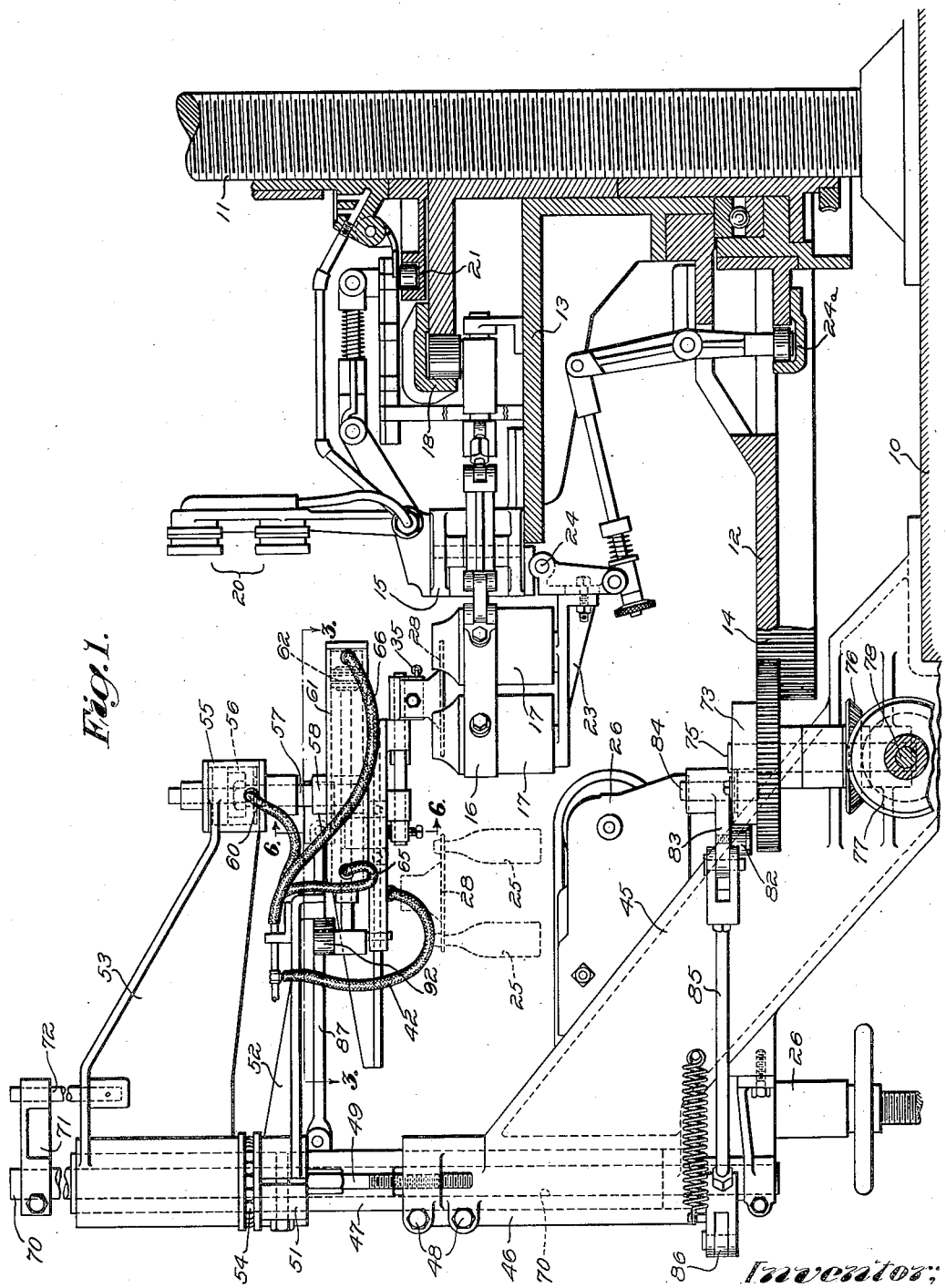

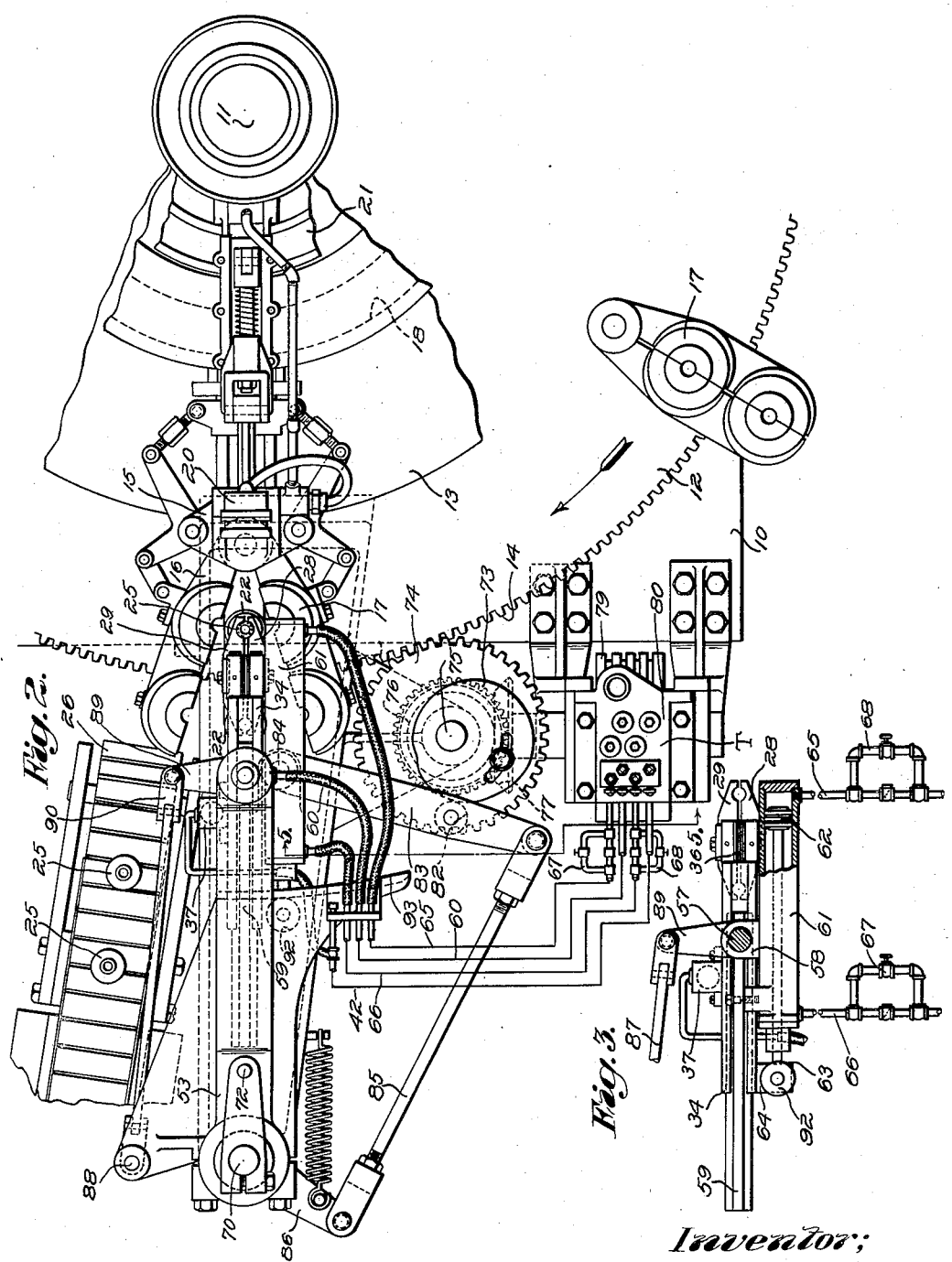

Sept. 18, 1934.  A. J. SMITH  1,974,394
TRANSFER MECHANISM
Filed Feb. 24, 1931  3 Sheets-Sheet 3
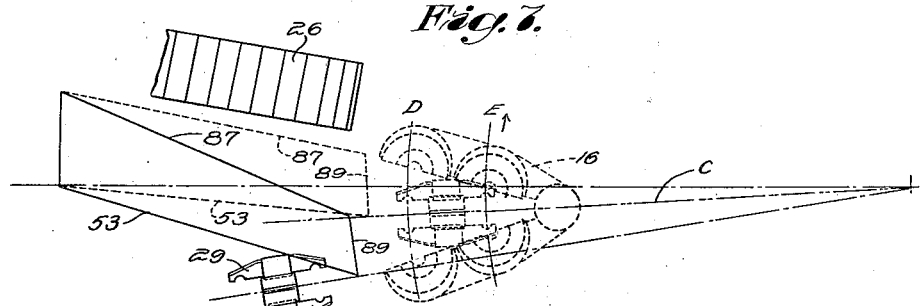
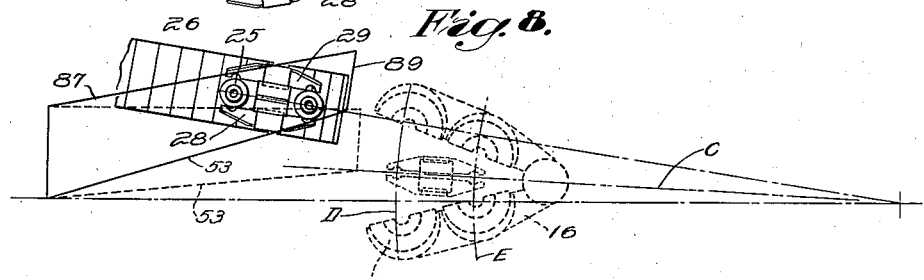
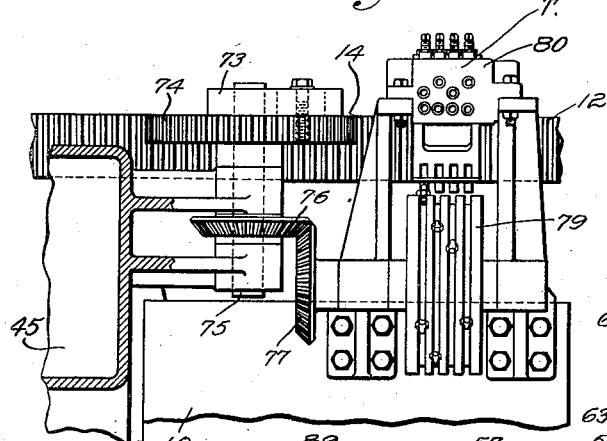
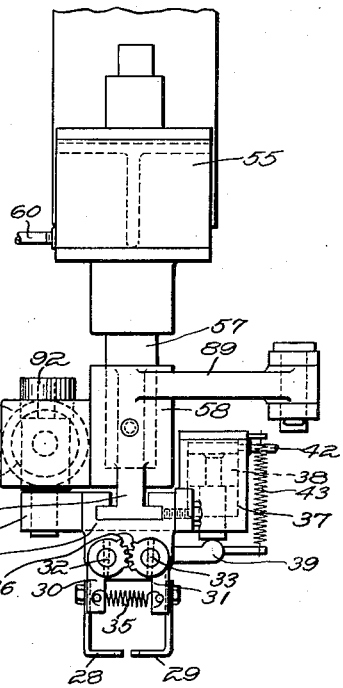
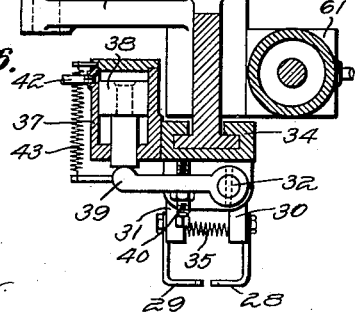
Witness:
W. B. Thayer.
Inventor:
Algy J. Smith
by Brown & Parham
Attorneys Patented Sept. 18, 1934

1,974,394

UNITED STATES PATENT OFFICE 1,974,394

TRANSFER MECHANISM

Algy J. Smith, Bloomfield, Conn., assignor to Hartford-Empire Company, Hartford, Conn., a corporation of Delaware Application February 24, 1931, Serial No. 517,695

15 Claims. (Cl. 49—14)

This invention relates to transfer mechanism and has particular relation to mechanism adapted successively to cooperate with the molds on a continuously rotating mold table to remove articles of glassware from the molds and to deliver them at the desired place, without interrupting the movement of the table.

Various mechanisms of the above character have been proposed heretofore, but many of them have been of such construction as to require their being supported by the mold tables themselves or the column of the table about which the table revolves, thereby making their use inconvenient under certain circumstances.

It is the general object of this invention to provide a novel mechanism for removing glassware from the molds on a rotatable mold table, which mechanism is supported entirely independently of the mold table and/or of the column of the table, so that interference between the transfer mechanism and parts carried by the table positively is assured. The mechanism preferably is constructed to move in radial, as well as vertical, alignment with one or more molds for the removal of ware therefrom while the molds are moving.

Another object of the invention is to provide a novel mechanism for successively removing pluralities of glass articles from plural mold units on a rotatable mold table, and to deliver them at the desired place, without necessitating the interruption of the rotation of the mold table during the removal of the articles.

Still another object of the invention is to provide a novel tongs transfer mechanism adapted successively to remove pluralities of glass articles from the plural mold units on a mold table, while the mold table is rotating, and to deliver said pluralities of articles at a place of delivery.

For the accomplishment of that object, the mechanism may be so constructed and may so operate that as each mold unit moves into a transfer zone, the plural tongs are moved into vertical alignment with the articles in the mold, and after being so operated are caused to travel about the center of the mold table with the gripping portions of the plural tongs in both horizontal and vertical alignment with the articles of glassware, for a sufficient distance for the tongs to close about the articles. The mechanism also may be so constructed that after the tongs have closed about a plurality of articles, the tongs and articles are raised and moved outwardly clear of the molds to a place of delivery where the tongs are opened, releasing the articles therefrom.

More specifically it is an object of the invention to provide a single takeout mechanism of novel construction, adapted successively to remove finished articles of glassware from successive plural mold units on a continuously rotating finishing mold table. When so employed, plural tongs embodied in the mechanism of the invention, are moved into horizontal and vertical alignment with the finished glassware, and caused to travel while in such alignment about the center of the mold table, during which time the articles of glassware are gripped by the tongs. The tongs and articles afterwards may be moved outwardly of the mold table clear of the mold unit to a position above a suitable conveyor where the tongs are opened to deposit the finished articles on the conveyor. In that manner, the mechanism may successively remove pluralities of articles of glassware from successive plural mold units on the finishing mold table while the mold table rotates.

The invention contemplates other objects which will be pointed out in the following description thereof, or will become apparent from such description.

In order that the invention may more readily be understood and its manifold advantages appreciated, reference should be had to the accompanying drawings in which apparatus embodying the invention is illustrated.

In said drawings:

Figure 1 is a view partly in side elevation and partly in vertical section showing mechanism embodying the invention which may be associated with a finishing mold table, shown only in part, carrying a series of plural finishing molds;

Fig. 2 is a view in top plan of the apparatus shown in Fig. 1;

Fig. 3 is a view in horizontal sectional top plan of a part of the apparatus shown in Figs. 1 and 2, illustrating the mechanism for horizontally moving the tongs inwardly and outwardly of the mold table, said view being taken substantially on the line 3—3 of Fig. 1;

Fig. 4 is an end elevation of a fragmentary part of the apparatus shown in Figs. 1 and 2, said view being enlarged to show more clearly the construction and arrangement of the tongs and associated mechanism;

Fig. 5 is an enlarged view in transverse vertical section of a fragmentary portion of the construction shown in Fig. 2, and taken substantially on the line 5—5 of Fig. 2;

Fig. 6 is a view in transverse vertical section showing in further detail the parts of the apparatus shown in Fig. 4, and taken substantially on the line 6—6 of Fig. 1; and Figs. 7 and 8 are diagrammatic views illustrating the principle of operation of the mechanism shown in Figs. 1 to 6 inclusive.

Mechanism embodying the invention has been illustrated by way of example for use with the finishing mold table of a continuous two-table forming machine in which the molds are of the plural type, although it will be understood that it is equally well adapted for use in conjunction with a continuous one-table machine, or with an intermittent one or two-table machine from the molds of which, ware is removed while the molds move. Mechanism of the invention also may be used to advantage in the above types of machines for removing panel bottles or the like from the molds thereof, or for effecting speedy alignment of the mechanism with the molds of intermittent machines which came to rest at the time that the ware actually is removed from the molds thereon.

The finishing mold table only is shown in the drawings, the parison mold table having been omitted for clarity.

As shown in Figs. 1 and 2, the base 10 of the machine has a column 11 mounted thereon about which the finishing mold table rotates, said table comprising a lower part 12 and an upper part 13, which are secured together for rotation.

The table may be rotated by any suitable means not shown, engaging the gear 14 formed on the periphery of the lower part 12 of the table, which gear serves an additional purpose as hereinafter explained.

Mounted on the upper part or section 13 of the table is a bracket 15 in which the holders 16 of the sections 17 of the plural finishing mold unit, pivotally are mounted.

The finishing molds are opened and closed by linkage interposed between the holders 16 and a cam 18 secured to the column 11.

A plural blow head 20 is mounted in bracket 15 for oscillation downwardly and upwardly into and out of engagement with the top of the finishing mold, such movement being effected by linkage interposed between the blow head structure and a cam 21 likewise secured to the column 11.

The bottoms of the finishing molds are closed by plural bottom plates 22, Fig. 2, carried by an arm 23 pivoted at 24 to the bottom of bracket 15. The bottom plates are raised into and out of horizontal position for cooperation with the finishing mold, and for supporting finished articles of glassware after the finishing molds are opened, by connections between the arm 23 which supports them, and a cam 24 also supported by the column 11.

After finished articles of glassware have been formed in the finishing mold in the usual manner, the finishing molds are opened leaving such articles supported by the bottom plate, articles 25 being so shown in Fig. 2, whereupon takeout mechanism embodying the invention, and which is about to be described, operates to remove the finished articles from between the molds and to deposit them at a suitable place of delivery, illustrated in this connection by way of example as an intermittently operating conveyor 26, which may be of suitable known construction.

The transfer mechanism comprises a pair of grippers 28, and 29, Figs. 1, 2, 4 and 6, bolted at their centers, Figs. 1 and 2, to arms 30 and 31, respectively, Figs. 4 and 6, on shafts 32 and 33 journaled horizontally in a slide 34 supported and operated in a manner hereinafter described.

A tension spring 35 interposed between arms 30 and 31, yieldingly holds the grippers in closed position, as shown for example in Figs. 4 and 6, and intermeshing segmental gears 36 secured to the forward end of shafts 32 and 33, assure joint closing and opening operation of the grippers.

The grippers are opened and closed by means of an air motor, the cylinder 37 of which is secured to the innermost end portion of slide 34, as shown in Figs. 2 and 6, said cylinder containing a piston 38, the rod of which contacts with a lever 39, secured to horizontal shaft 32. The extent of closing movement of the grippers is regulated by an adjusting screw 40 in the arm 39, Fig. 6, which engages the bottom of slide 34 upon upward closing movement of the lever 39.

Air is admitted through a conduit 42 leading from a timer T to depress piston 38 against the force of a tension spring 43 connected to the outer end of lever 39, as shown in Figs. 4 and 6, to open the grippers, and exhaust of such air pressure through the timer T, permits closing of the grippers by the contraction of tension spring 43. The closing of the grippers also is assisted by tension spring 35, previously referred to.

The slide 34 which carries the grippers is supported and operated by the following means:

Secured to the base 10 of the machine and inclined upwardly therefrom is a casting 45 which terminates at its outer end in a vertical sleeve 46.

Mounted in the sleeve 46 is the vertical sleeve bearing 47. The sleeve bearing 47 is rigidly held in the sleeve 46 by clamping bolts 48 which bolts, however, may be loosened to permit vertical adjustment of said sleeve bearing. That is effected by means of screw 49 which, at its upper end, bears against the hub portion 51 of a plate 52 rigidly clamped to the sleeve bearing 47. The purpose of plate 52 is described hereinafter.

As shown in Fig. 1, sleeve bearing 47 extends above sleeve 46 a substantial distance. The top portion thereof provides a bearing for an arm 53, the bottom hub portion of which rests on ball bearings 54 which in turn ride in a raceway formed partly in said hub portion, and partly in the top of the hub portion 51 of plate 52.

The outer end of arm 53 terminates in an air cylinder 55 containing a piston 56, having a downwardly extending piston rod 57, Figs. 1 and 4, to the bottom end of which rod the horizontal supporting member 58 rigidly is connected. The member 58 has a guide rail 59 of inverted T-shape in cross section formed on its under side upon which slide 34, previously mentioned, is mounted for reciprocation.

From the foregoing it will be seen that the tongs or grippers 28 are supported for rotary movement about the vertical axis of sleeve 47 by means of the arm 53, for vertical movement relative to the arm 53 by means of piston 56 in cylinder 55, and for horizontal sliding movement relative to arm 53 by the provision of slide 34 on guide rail 59. The tongs also are mounted for oscillatory movement relative to arm 53, that being permitted by piston 56 in cylinder 55.

Vertical movement of the grippers relative to arm 53 is effected by the admission and exhaust of air pressure to and from the space in the bottom of cylinder 55 through a conduit 60 which leads from timer T as shown in Fig. 2. Admission of air pressure through conduit 60 from the timer acts on piston 56 to raise horizontal supporting member 58, and the grippers, and exhaust of air pressure therethrough permits the same parts to be lowered by gravity.

Such vertical movement of the grippers are utilized for raising finished articles of glassware from the bottom plates associated with the finishing mold after the grippers have been closed about them, and subsequently to lower the grippers and articles after they have been reciprocated outwardly of the mold into a position for the deposit of the finished glassware on the conveyor 26.

The grippers are reciprocated to and from ware-receiving to ware-delivery positions, or into and out of the positions in which they are shown in full lines in Figs. 1 and 2 and in dotted lines in the same figures, by means of an air motor comprising a cylinder 61, Figs. 1, 2, 4 and 6, secured to one side of horizontal supporting member 58. Said cylinder contains a piston 62 connected by means of a cross head indicated at 63, Figs. 3 and 4, to a lug 64 on slide 34.

Air pressure alternately is admitted to and exhausted from the spaces in the opposite ends of cylinder 61 to effect the reciprocation of slide 34 and the grippers 28 and 29 at the desired time, through conduits 65 and 66, which lead from timer T. The rate of movement during reciprocation may be controlled by by-passes 67 and 68 provided in the respective conduits 65 and 66, and containing suitable regulating valves, said by-passes extending around suitable check valves in said conduits.

It will be understood that the timer T controls the vertical movements, the horizontal movements, and the opening and closing movements of the grippers in suitably timed relation such as may be desirable in effecting transfer operations.

The supporting arm 53 is mounted for oscillation relative to support 45, and piston 56 is mounted for rotation in cylinder 55 to permit a corresponding relative rotation of the grippers to said arm 53, in order to permit the component of such movements to be imparted to the grippers to cause them to travel about the axis of the finishing mold table when they are held in vertical alignment with the bottom plates 22 associated with the finishing mold, and articles of glassware 25 supported thereby. That permits removal of the glassware from the bottom plates without risk of injury to the glassware, and while the finishing mold table continues to rotate. The mechanism which primarily controls such movement of the grippers is as follows:

Extending vertically through bearing sleeve 47, is the vertical rock shaft 70. Motion is transmitted from rock shaft 70 to arm 53 by horizontal crank member 71 clamped to the upper end of shaft 70 and connected to arm 53 by a vertical pin 72.

Motion is imparted to rock shaft 70 by a cam 73, Figs. 1, 2 and 5, adjustably secured to horizontal spur gear 74 and mounted eccentrically of the center thereof.

Spur gear 74 is carried by countershaft 75 journaled in suitable bearings formed on supporting member 45, said spur gear meshing with the gear 14 formed on the periphery of the bottom portion 12 of the finishing mold table. Thus the gear 74 is driven from the table 12.

Countershaft 75 also carries a bevel gear 76 which meshes with a similar bevel gear 77 on a horizontal shaft 78 of timer T, and which carries the drum 79 of said timer.

It will be understood that the timer T may be of suitable known construction, as shown for example in Fig. 5, and that the drum 79 may have buttons adjustably mounted thereon for operating valves (not shown) in a valve casing 80 of the timer at desired times for controlling the passage of air through the conduits 42, 60, 65 and 66. The timer construction forms no part per se of the present invention and hence need not be further described.

The edge of cam 73 is engaged by a roller 82 on the under side of a horizontal lever 83 pivoted at one end to support 45 as indicated at 84, Figs. 1 and 2, and connected at its other end to a link 85 which in turn is joined to an arm 86 on the bottom of vertical rock shaft 70.

It will be understood that cam 73 will be suitably shaped and operated at the appropriate speed to oscillate supporting arm 53 at the desired times and through the desired amplitude.

Oscillation of arm 53 tends to move the grippers carried thereby about the center of bearing sleeve 47 as an axis, and such tendency is converted into movement of the grippers about the axis of the finishing mold table by means of a link 87, Figs. 1 and 2. As indicated at 88, link 87 is pivotally connected at its inner end by means of a clevis thereon to a portion of plate 52, previously referred to, at a certain distance from the axis of rock shaft 70. At its outer end, link 87 is joined to a crank arm 89, Figs. 2, 4 and 6, extending laterally of the horizontal supporting member 58 for the slide 34 in line with the axis of piston rod 57. Link 87 preferably is joined to crank arm 89 by means of a universal knuckle joint indicated at 90, Fig. 2. The distance between the point of connection of link 87 with arm 89 and the axis of rod 57 (and piston 56) preferably is less than the distance between the pivot point 88 of the link on plate 52, and the axis of rock shaft 70.

Plate 52 is rigid and stationary as previously explained, and consequently horizontal longitudinal movement of link 87 relative thereto cannot occur. Therefore, when supporting arm 53 is oscillated by the mechanism previously described, link 87, acts through crank arm 89, to rotate the support for the grippers and hence the grippers themselves relative to the arm 53 and about the axis of piston 56 and its rod 57. The joint and relative oscillations of the arm 53 and of the grippers causes the grippers to travel as a unit about the axis of the finishing mold table in radial or horizontal alignment with the bottom plate 22 of the finishing mold unit and finished articles of glassware 25 thereon.

The expression "horizontal alignment", as used above and in the claims, is intended to apply to the positioning of the grippers with their ware receiving portions in the same vertical plane as the vertical axes of the cavities of a plural cavity mold unit, whether or not such plane is radial to the mold table.

During such movement the grippers are maintained in vertical alignment with the plates and articles by means of a roller 92, Figs. 1, 2, 3, and 4, which may be carried by the cross head 63 by means of which piston 62 is connected to slide 34 as previously explained, roller 92 riding in engagement with the inner edge of a cam 93 formed on the outer edge of stationary plate 52, and laid out on a circle struck from the axis of the finishing mold table. Cam roller 92 is moved into and retained in engagement with cam 93 upon the admission and exhaust of air pressure to and from the inner and outer ends respectively of cylinder 61, for the purpose of projecting the grippers in ware-receiving position above a mold unit.

As previously stated, the distance between the point of connection of link 87 with plate 52, and the center of rock shaft 70, is greater than the distance between the point of connection of the other end of link 87 to crank 89, and the center of piston 56, or the vertical axis thereof about which the grippers are rotated relative to arm 53. Therefore, link 87 and arm 53 constitute non-parallel linkage by means of which the grippers are oscillated to maintain them in radial alignment with a mold unit. That is shown diagrammatically in Figs. 7 and 8, wherein the lines 53, 87 and 89 illustrate the geometrical relations between the arm 53, link 87, and crank 89, at different stages of operation.

A preferred mode of operating the above-described apparatus embodying the invention is as follows:

The finishing mold table 12 continuously is rotated in a clockwise direction to successively move plural finishing mold units through the transfer zone.

As one of said units is moved toward the transfer zone, rock shaft 70 and the grippers are oscillated in a clockwise direction by cam 73, as a result of which the grippers themselves rotate in a counter-clockwise direction relative to their support into substantially the position in which the grippers 28 and 29 are shown in full lines in Fig. 7. At this time, the grippers will be in their lowermost position, having previously been moved downwardly after depositing a plurality of glass articles onto the conveyor 26, and also will be in radial alignment with the finishing mold table.

Shortly before radial alignment is obtained between the grippers and the finished articles 25 supported on the bottom plates 22 of the finishing mold unit, the grippers 28 and 29 are moved inwardly of the finishing mold unit by the reciprocation of piston 62 in cylinder 61 under control of timer T. That causes roller 92 to strike cam 93 so that by the time the finishing mold reaches a position as shown substantially in dotted lines in Fig. 7, the grippers 28 and 29 will be in vertical as well as radial alignment with finished articles 25. The grippers 28 and 29 are so shown in dotted lines in Fig. 7, which also shows in dotted lines, the corresponding positions of arms 53 and 89, and link 87. Such alignment of the grippers with the finished articles 25 on the bottom plates 22 may be effected slightly before the centers of the bottom plates have moved onto the line of centers (Figs. 7 and 8) of the finishing mold table and the rock shaft 70.

The grippers now are caused to move while in radial alignment with the finished articles and bottom plates by the previously described non-parallel linkage constituted by arm 53 and link 87 under the control of cam 73. Simultaneously, vertical alignment is maintained by cam 93. As a result, the centers of the gripping portions of the grippers, are moved in circular paths as indicated at D and E, Figs. 7 and 8, about the axis of the finishing mold table.

At the desired time, the grippers may be closed about the plurality of glass articles by the release of air pressure from cylinder 37 through conduit 42 and timer T. Thus, the grippers may close at the time that the finished articles on the bottom plate move onto the line of centers C, in which position they are shown in Figs. 7 and 8.

After closing, the grippers, which in the meantime have been moving about the axis of the mold table, and articles 25 supported thereby, are raised to clear the bottoms of the articles of the bottom plates 22 by the admission of air pressure to the bottom of cylinder 55, through conduit 60, leading from timer T, after which they are moved outwardly from between the mold sections, such movement resulting from the time control of admission and exhaust of air pressure to and from the appropriate ends of air motor cylinder 61. When piston 62 in cylinder 61 has reached the end of its stroke, arm 53 and link 87 will have been moved into the positions shown by the full lines 53 and 87 in Fig. 8, as a result of which the grippers and articles carried thereby are located above the conveyor 26 in longitudinal alignment therewith, as also shown in full lines in Fig. 8 and in dotted lines, Fig. 1.

Air pressure now is exhausted from cylinder 55 to lower the grippers and articles toward the conveyor whereupon air pressure is admitted to cylinder 37 to open the grippers, depositing the articles on the conveyor. The grippers may then be raised to clear the articles and after clearing them, lowered into the plane in which they engage articles on the bottom plates, by operation of piston 56.

The rock shaft again is oscillated in a clockwise direction to return the grippers into the position in which they are shown in full lines in Fig. 7, for the beginning of another transfer operation in cooperation with the plural finishing mold unit succeeding the one from which finished articles already have been removed.

Although apparatus embodying the invention has been illustrated for use as a takeout mechanism in removing glassware from the molds of a continuously rotating two-table glassware forming machine, it will be understood that the invention is susceptible for use with a continuous one-table machine and in other relations, and that various changes may be made in the details of constructions and arrangement of the apparatus embodying the invention without departing from the scope of the appended claims.

The movement imparted to the tongs may be utilized to advantage for obtaining both radial and vertical alignment thereof with plural mold units of an intermittent machine just prior to the time that the machine comes to rest, thereby permitting a more rapid removal operation, or for removing ware from such units while they are in motion. It also is of utility for the removal of single or plural panel bottles from one or two-table continuous or intermittent machines in which removal, relative rotation between the bottles and their supports, and possible injury to the bottles, would be prevented by the novel mechanism.

Having thus described the invention, what it is desired to claim and to secure by Letters Patent is:

1. In combination with a forming machine including a rotatable mold table having a series of plural mold units mounted thereon, means for rotating said table to move said units, transfer mechanism for removing pluralities of articles from said units during rotation thereof, said mechanism comprising a ware holder adapted to carry a plurality of glass articles, means including a column separate from the forming machine for supporting said holder for rotary movement about an axis eccentric to the axis of the mold table, means for periodically and successively moving said ware holder into horizontal and vertical alignment with pluralities of glass articles formed successively in and carried by said units, means for periodically moving said ware holder about the axis of the mold table to maintain such alignment of the ware holder and mold units during rotation of the units, means for operating said ware holder during such movement to remove the articles from the moving mold unit in which they are carried, and means for periodically moving said ware holder toward and away from a place of delivery where said articles are deposited.

2. In combination with a rotatable mold table having a series of plural mold units mounted thereon, means for rotating said table and units, transfer mechanism for successively removing pluralities of glass articles from said units during rotation thereof, said mechanism comprising a ware holder adapted to carry a plurality of such articles, an arm mounted for oscillation about an axis eccentric to the axis of said mold tables, a support for said ware holder mounted on said arm for oscillation about a vertical axis fixed with respect to said arm, means for imparting oscillatory movement to said arm, and means for oscillating said support to move said ware holder horizontally relative to said arm and for holding said ware holder in horizontal alignment with a plurality of articles in one of said units, during rotation of said last-named unit.

3. In combination with a rotatable mold table having a series of plural mold units mounted thereon, means for rotating said table and mold units, transfer mechanism for successively removing pluralities of glass articles from said units during rotation thereof, said mechanism comprising a ware holder adapted to carry a plurality of such articles, an arm mounted for oscillation about an axis eccentric to the axis of said mold table, a support for said ware holder mounted on said arm for oscillation about a vertical axis fixed with respect to said arm, means for imparting rotary movement to said arm and support to move said ware holder horizontally, means to oscillate said support relative to said arm for maintaining said ware holder in horizontal alignment with a plurality of articles in one of said units during such horizontal movement, and means for maintaining said ware holder in vertical alignment with said articles during the movement thereof in horizontal alignment with said articles.

4. In combination with a rotatable mold table having a series of plural mold units mounted thereon, means for rotating said table and mold units, transfer mechanism for successively removing pluralities of glass articles from said units during rotation thereof, said mechanism comprising a ware holder adapted to carry a plurality of such articles, an arm mounted for oscillation about an axis eccentric to the axis of said mold table, a support for said ware holder mounted on said arm for oscillation relative to said arm about a vertical axis fixed with respect to said arm, means for imparting rotary movement to said arm and to said support to move said ware holder horizontally, means to oscillate said support relative to said arm for maintaining said ware holder in horizontal alignment with a plurality of glass articles in one of said units during such rotary movement, and means for raising and lowering said ware holder.

5. In combination with a rotatable mold table having a series of plural mold units mounted thereon, means for rotating said table and units, transfer mechanism for successively removing pluralities of glass articles from said units during rotation thereof, said mechanism comprising a ware holder adapted to carry a plurality of such articles, an arm mounted for oscillation about an axis eccentric to the axis of said mold table, a support for said ware holder mounted on said arm for oscillation about a vertical axis fixed with respect to said arm, means for imparting rotary movement to said arm and to said support to move said ware holder horizontally, means to oscillate said support relative to said arm for maintaining said ware holder in horizontal alignment with a plurality of articles in one of said units during such horizontal movement and during rotation of the unit, means for maintaining said ware holder in vertical alignment with said articles during the movement thereof in horizontal alignment with said articles, and means for raising and lowering said ware holder.

6. In glassware transfer apparatus, the combination of a holder, an arm mounted for rotary movement about a vertical axis, a support for the holder mounted for rotary movement about a vertical axis fixed with respect to said arm, a crank arm connected to said support in alignment with the axis about which said support is adapted to rotate, a link connected to the last-named arm, means for holding said link against longitudinal movement, and means for imparting rotary movement to the first-named arm to move said holder through non-parallel positions.

7. In glassware transfer apparatus, the combination of a holder, an arm mounted for rotary movement about a vertical axis, a cylinder carried by said arm, a piston rotatably mounted in said cylinder, a support for said holder carried by said piston, and means for imparting a rotary movement to said arm and for swinging said piston, the support, and the holder about the axis of said piston.

8. In combination with a forming machine including a continuously rotating mold table having a series of plural mold units mounted thereon, takeout mechanism for successively removing pluralities of articles from said units, said mechanism comprising a ware holder adapted to carry a plurality of glass articles, an arm mounted for rotary movement about a vertical axis eccentric to the mold table, a cylinder carried by said arm, a piston in said cylinder, a support for said ware holder carried by said piston, said piston being rotatable relative to said arm, whereby said holder and support may be rotated about a vertical axis fixed relative to said arm, a slide carried by said support, said ware holder being mounted on said slide, means for admitting and exhausting air pressure to and from said cylinder to move the piston therein and the support and ware holder carried by said piston vertically, means for reciprocating said slide to horizontally move the ware holder mounted thereon, a crank arm connected to said support, a link connected to said crank arm, means for holding said link against longitudinal movement, said first-named arm and said link constituting non-parallel linkage, and means for imparting rotary movement to said first-named arm, whereby the non-parallel linkage of which said arm is a part, causes the ware holder to be moved in radial alignment with successive mold units on the continuously rotating mold table.

9. Glassware transferring apparatus comprising a ware holder, and means for moving said ware holder through non-parallel positions comprising non-parallel linkage constituted by two non-parallel side members, fixed pivots for two adjacent ends of said members, and an end member pivotally connecting the opposite adjoining ends of said side members, a support for the ware holder joined to the linkage, means for connecting the end member to the support, and means for oscillating said side members to oscillate said end member and the ware holder.

10. Glassware transferring apparatus comprising a ware holder, and means for moving said ware holder through non-parallel positions comprising non-parallel linkage constituted by two non-parallel side members, fixed pivots upon which two adjacent ends of said side members are mounted, an end member pivotally connecting the opposite adjoining ends of said side members, a support for the ware holder, a pivotal connection for said support fixed in one of the members of said linkage, means for connecting the end member to the support, and means for oscillating said side members of the linkage to oscillate said end member and the support for the ware holder.

11. Glassware transferring apparatus comprising a ware holder, and means for moving said ware holder through non-parallel positions comprising non-parallel linkage constituted by two non-parallel side members, fixed pivots upon which two adjacent ends of said side members are mounted, an end member pivotally connecting the opposite adjacent ends of said side members, a support for the ware holder, means for pivotally connecting the support to one end of one of the side members, means for connecting the end member to the support, and means for oscillating said linkage to oscillate the end member thereof and the ware holder.

12. In combination with a glassware forming machine having a plural mold unit thereon, means for rotating said machine to cause said unit to travel through a take-out zone, and take-out mechanism comprising a carrier, means for mounting said carrier for rotary movement about an axis located laterally of the machine, a ware holder having plural ware receiving portions, means for connecting the ware holder to the carrier, means for imparting rotary movement to said carrier to move the ware holder in about the same direction in which the mold unit travels, means for vertically aligning the ware receiving portions of the ware holder with the cavities of the mold unit, means for maintaining such alignment of the ware receiving portions of the ware holder and mold cavities during the rotary movement of the carrier and the travel of the mold unit, including means for preventing relative axial movement between the ware holder and the mold unit, and means for operating said ware holder during such travel of the mold unit to remove a plurality of articles from the mold unit.

13. In combination with a glassware forming machine having a plural mold unit thereon, means for rotating said machine to cause said unit to travel through a take-out zone, and take-out mechanism comprising a carrier, means for mounting said carrier for rotary movement about an axis located laterally of the machine, a ware holder having plural ware receiving portions, means for connecting the ware holder to the carrier, means for imparting rotary movement to said carrier to move the ware holder in about the same direction in which the mold unit travels, means for vertically aligning the ware receiving portions of the ware holder with the cavities of the mold unit, means for rotating the ware holder relative to said carrier to maintain the alignment of the ware-receiving portions thereof with the mold cavities during the rotary movement of the carrier and the travel of the mold unit, and means for operating said ware holder during the travel thereof with the mold unit to remove a plurality of articles from said unit.

14. In combination with a glassware forming machine having a plural mold unit thereon, means for rotating said machine to cause said unit to travel through a take-out zone, and take-out mechanism comprising a carrier, means for mounting said carrier for rotary movement about an axis located laterally of the machine, a ware holder having plural ware receiving portions, means providing a pivotal connection between the ware holder and the carrier axially fixed with respect to the carrier, means for imparting rotary movement to said carrier to move the ware holder in about the same direction in which the mold unit travels, means for vertically aligning the ware receiving portions of the ware holder with the cavities of the mold unit, means for rotating the ware holder relative to the carrier about the axially fixed pivotal connection between the carrier and ware holder to maintain the ware receiving portions of the ware holder in vertical alignment with the mold cavities during the travel of the mold unit, and means for operating said ware holder during the travel of the mold unit to remove a plurality of articles from said unit.

15. Glassware transferring apparatus comprising a ware holder, means for moving said holder through non-parallel positions, comprising a pair of non-parallel members, means for supporting said ware holder from one of said members for horizontal rotary movement relative thereto, means for oscillating said member periodically, and a connection between said ware holder and the other non-parallel member for causing rotary movement of the ware holder relative to said members in response to the oscillation imparted to one of said members.

ALGY J. SMITH.